United States Patent
Shatsky et al.

(10) Patent No.: US 12,339,805 B2
(45) Date of Patent: Jun. 24, 2025

(54) FACILITATING ACCESS TO FRAGMENTED SNAPSHOT DATA

(71) Applicant: Dell Products L.P., Round Rock, TX (US)

(72) Inventors: Yosef Shatsky, Karnei Shomron (IL); Doron Tal, Geva Carmel (IL)

(73) Assignee: Dell Products L.P., Round Rock, TX (US)

(*) Notice: Subject to any disclaimer, the term of this patent is extended or adjusted under 35 U.S.C. 154(b) by 107 days.

(21) Appl. No.: 18/362,088

(22) Filed: Jul. 31, 2023

(65) Prior Publication Data

US 2025/0045242 A1    Feb. 6, 2025

(51) Int. Cl.
*G06F 16/11*    (2019.01)
*G06F 11/34*    (2006.01)
*G06F 16/16*    (2019.01)

(52) U.S. Cl.
CPC ........ *G06F 16/122* (2019.01); *G06F 11/3409* (2013.01); *G06F 16/128* (2019.01); *G06F 16/164* (2019.01)

(58) Field of Classification Search
CPC .. G06F 16/122; G06F 11/3409; G06F 16/128; G06F 16/164
See application file for complete search history.

(56) References Cited

U.S. PATENT DOCUMENTS

| 5,381,539 | A | 1/1995 | Yanai et al. |
| 5,551,003 | A | 8/1996 | Mattson et al. |
| 5,764,880 | A | 6/1998 | Gerdt et al. |
| 6,052,799 | A | 4/2000 | Li et al. |
| 6,941,420 | B2 | 9/2005 | Butterworth et al. |
| 7,617,358 | B1 * | 11/2009 | Liikanen ............ G11B 20/1217 711/158 |

(Continued)

FOREIGN PATENT DOCUMENTS

| WO | 2015108670 A1 | 7/2015 |
| WO | 2020204880 A1 | 10/2020 |
| WO | 2020204882 A1 | 10/2020 |

OTHER PUBLICATIONS

International Search Report and Written Opinion of PCT/US2019/024885 dated Jan. 7, 2020, 13 pages.

(Continued)

*Primary Examiner* — Dennis Truong
(74) *Attorney, Agent, or Firm* — Ryan, Mason & Lewis, LLP

(57) ABSTRACT

Techniques are provided to facilitate access to fragmented snapshot data. For example, a storage control system generates a snapshot data structure of a storage volume. The snapshot data structure comprises plurality of nodes comprising a volume node and one or more snapshot nodes, the volume node is configured to store new and updated data that is written to logical offsets of the storage volume, and the one or more snapshot nodes comprise point-in-time copies of data of the storage volume taken at different times. The storage control system adds an entry for the volume node in a metadata structure associated with the snapshot data structure, wherein the entry comprises a reference to a physical location of data held by a given one of the snapshot nodes at a given logical offset of the storage volume.

20 Claims, 6 Drawing Sheets

(56) References Cited

U.S. PATENT DOCUMENTS

| | | | |
|---|---|---|---|
| 7,987,156 B1* | 7/2011 | Chatterjee | G06F 11/1451 |
| | | | 707/649 |
| 8,843,676 B2 | 9/2014 | Rajamanickam et al. | |
| 9,372,751 B2 | 6/2016 | McNutt | |
| 9,514,014 B2 | 12/2016 | Webman et al. | |
| 9,892,045 B1 | 2/2018 | Douglis et al. | |
| 10,078,598 B1 | 9/2018 | Wallace et al. | |
| 10,331,561 B1 | 6/2019 | Shilane et al. | |
| 10,445,180 B2 | 10/2019 | Butterworth et al. | |
| 10,986,174 B1 | 4/2021 | Sharma et al. | |
| 11,119,668 B1 | 9/2021 | Keller et al. | |
| 11,144,399 B1 | 10/2021 | Yarimi et al. | |
| 11,163,479 B2 | 11/2021 | Lieblich et al. | |
| 11,163,699 B2 | 11/2021 | Keller et al. | |
| 11,221,975 B2 | 1/2022 | Puder et al. | |
| 11,262,933 B2 | 3/2022 | Matosevich et al. | |
| 11,301,162 B2 | 4/2022 | Matosevich et al. | |
| 11,307,935 B2 | 4/2022 | Keller et al. | |
| 11,372,810 B2 | 6/2022 | Keller et al. | |
| 11,416,396 B2 | 8/2022 | Shatsky et al. | |
| 11,418,589 B1 | 8/2022 | Spiegelman | |
| 11,487,432 B2 | 11/2022 | Aharoni et al. | |
| 11,487,460 B2 | 11/2022 | Keller et al. | |
| 11,513,997 B2 | 11/2022 | Keller et al. | |
| 11,550,479 B1 | 1/2023 | Shatsky et al. | |
| 11,573,736 B2 | 2/2023 | Matosevich et al. | |
| 11,606,429 B2 | 3/2023 | Aharoni et al. | |
| 11,609,854 B1 | 3/2023 | Shatsky et al. | |
| 11,630,773 B1 | 4/2023 | Shatsky et al. | |
| 11,636,089 B2 | 4/2023 | Aharoni et al. | |
| 11,650,920 B1 | 5/2023 | Shatsky et al. | |
| 11,675,789 B2 | 6/2023 | Shatsky et al. | |
| 11,687,536 B2 | 6/2023 | Sharma et al. | |
| 11,704,053 B1 | 7/2023 | Tal et al. | |
| 11,704,160 B2 | 7/2023 | Shatsky et al. | |
| 2002/0032835 A1 | 3/2002 | Li et al. | |
| 2008/0021853 A1 | 1/2008 | Modha et al. | |
| 2009/0204761 A1 | 8/2009 | Caprioli et al. | |
| 2009/0276593 A1 | 11/2009 | Jacobson et al. | |
| 2012/0278560 A1* | 11/2012 | Benzion | G06F 12/0862 |
| | | | 711/137 |
| 2013/0042056 A1* | 2/2013 | Shats | G06F 12/0871 |
| | | | 711/E12.008 |
| 2013/0305002 A1 | 11/2013 | Hallak et al. | |
| 2014/0215147 A1 | 7/2014 | Pan | |
| 2014/0215262 A1 | 7/2014 | Li et al. | |
| 2014/0244935 A1 | 8/2014 | Ezra et al. | |
| 2015/0134879 A1* | 5/2015 | Zheng | G06F 11/1451 |
| | | | 711/114 |
| 2016/0103764 A1 | 4/2016 | Banerjee et al. | |
| 2018/0113640 A1 | 4/2018 | Fernandez et al. | |
| 2018/0267893 A1 | 9/2018 | Barzik et al. | |
| 2018/0300075 A1 | 10/2018 | Fernandez et al. | |
| 2018/0356989 A1* | 12/2018 | Meister | G06F 3/062 |
| 2019/0163587 A1 | 5/2019 | Anna et al. | |
| 2019/0227845 A1 | 7/2019 | Sridhar et al. | |
| 2020/0133503 A1 | 4/2020 | Sun et al. | |
| 2020/0356442 A1* | 11/2020 | Agarwal | G06F 11/1469 |
| 2021/0073079 A1* | 3/2021 | Venkatesan | G06F 3/0683 |
| 2021/0279187 A1 | 9/2021 | Puder et al. | |
| 2021/0294505 A1 | 9/2021 | Keller et al. | |
| 2021/0294774 A1* | 9/2021 | Keller | G06F 16/125 |
| 2021/0294775 A1 | 9/2021 | Keller et al. | |
| 2021/0303160 A1 | 9/2021 | Lieblich et al. | |
| 2021/0303169 A1 | 9/2021 | Tagar et al. | |
| 2021/0303202 A1 | 9/2021 | Ben Zeev et al. | |
| 2021/0303401 A1 | 9/2021 | Keller et al. | |
| 2021/0303407 A1* | 9/2021 | Keller | G06F 16/9027 |
| 2021/0303480 A1 | 9/2021 | Yarimi et al. | |
| 2021/0342297 A1* | 11/2021 | Gupta | G06F 16/128 |
| 2021/0373796 A1 | 12/2021 | Matosevich et al. | |
| 2022/0004320 A1 | 1/2022 | Matosevich et al. | |
| 2022/0035788 A1 | 2/2022 | Aharoni et al. | |
| 2022/0113867 A1 | 4/2022 | Aharoni et al. | |
| 2022/0114184 A1 | 4/2022 | Sharma et al. | |
| 2022/0116454 A1 | 4/2022 | Aharoni et al. | |
| 2022/0121458 A1 | 4/2022 | Moran et al. | |
| 2022/0129380 A1 | 4/2022 | Shatsky et al. | |
| 2022/0171567 A1 | 6/2022 | Matosevich et al. | |
| 2022/0187991 A1 | 6/2022 | Keller et al. | |
| 2022/0222113 A1 | 7/2022 | Shatsky et al. | |
| 2022/0342758 A1 | 10/2022 | Tal et al. | |
| 2022/0350497 A1 | 11/2022 | Matosevich et al. | |
| 2022/0358018 A1 | 11/2022 | Bar Shalom et al. | |
| 2022/0405254 A1 | 12/2022 | Shatsky et al. | |
| 2022/0414102 A1 | 12/2022 | Shatsky et al. | |
| 2023/0127321 A1 | 4/2023 | Shatsky et al. | |
| 2023/0236966 A1 | 7/2023 | Yarimi et al. | |
| 2023/0237029 A1 | 7/2023 | Tal et al. | |
| 2023/0334011 A1* | 10/2023 | Shatsky | G06F 3/067 |
| 2024/0143554 A1* | 5/2024 | Kaushik | G06F 3/0611 |

OTHER PUBLICATIONS

International Search Report and Written Opinion of PCT/US2019/024900 dated Jan. 7, 2020, 12 pages.
DELL EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," IEEE Symposium on High-Performance Computer Architecture, Feb. 11-15, 2006, pp. 200-211.
Wikipedia, "Raft (Computer Science)," https://en.wikipedia.org/wiki/Raft_(computer_science), Feb. 10, 2020, 4 pages.
Wikipedia, "Paxos (Computer Science)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
Dell EMC, "Getting To Know Dell EMC PowerFlex," Version 3.5.x, Rev. 02, Jan. 2021, 66 pages.
Dell EMC, "Dell EMC VxRack FLEX," Dell EMC Product Overview, Apr. 2018, 5 pages.
G. Soundararajan et al., "Dynamic Resource Allocation for Database Servers Running on Virtual Storage," FAST 2009: Proceedings of the 7th conference on File and storage technologies, Feb. 2009, pp. 71-84.
U.S. Appl. No. 17/681,449 filed in the name of Yosef Shatsky et al. Feb. 25, 2022, and entitled "Optimization for Garbage Collection in a Storage System."
U.S. Appl. No. 17/726,853 filed in the name of Irit Brener-Shalem et al. Apr. 22, 2022, and entitled "Intelligent Load Scheduling in a Storage System."
U.S. Appl. No. 17/729,219 filed in the name of Yosef Shatsky et al. Apr. 26, 2022, and entitled "Load Distribution in a Data Storage System."
U.S. Appl. No. 17/853,364 filed in the name of Yosef Shatsky et al. Jun. 29, 2022, and entitled "Managing Lookup Operations of a Metadata Structure for a Storage System."

(56) References Cited

OTHER PUBLICATIONS

U.S. Appl. No. 17/864,579 filed in the name of Yosef Shatsky et al. Jul. 14, 2022, and entitled "Managing Granularity of a Metadata Structure for a Storage System."
U.S. Appl. No. 17/868,045 filed in the name of Yosef Shatsky et al. Jul. 19, 2022, and entitled "Managing Insert Operations of a Metadata Structure for a Storage System."
U.S. Appl. No. 17/969,875 filed in the name of Yosef Shatsky et al. Oct. 20, 2022, and entitled "Multiple-Instance Write Cache for a Storage System."
U.S. Appl. No. 18/090,792 filed in the name of Christopher Trudel et al. Dec. 29, 2022, and entitled "Cluster Management in Large-Scale Storage Systems."
U.S. Appl. No. 18/092,516 filed in the name of Igal Moshkovich et al. Jan. 3, 2023, and entitled "Managing Data on Shutdown of Storage System."
U.S. Appl. No. 18/138,415 filed in the name of Yosef Shatsky et al. Apr. 24, 2023, and entitled "Dynamic Reserve Capacity in Storage Systems."
U.S. Appl. No. 18/138,415 filed in the name of Doron Tal et al. Jul. 13, 2023, and entitled "Multi-Modal Write Cache for Data Storage System."

\* cited by examiner

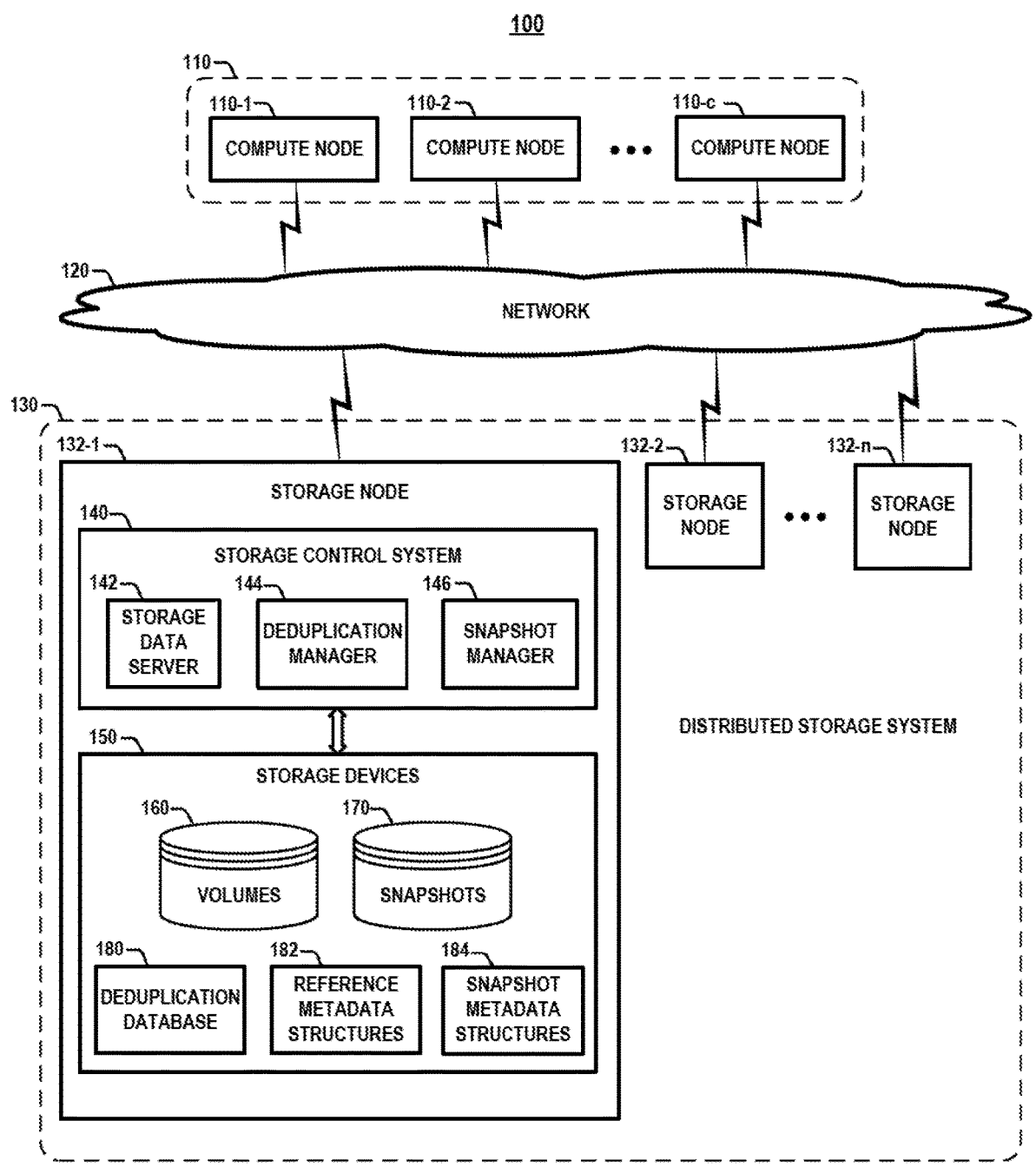

MAPPER
210

| VOL_ID | OFFSET | LOCATION |
|---|---|---|
| S1 | 0 | Dev_ID, Offset |
| S1 | 8 | Dev_ID, Offset |
| ⋮ | ⋮ | ⋮ |
| S1 | 8(n-1) | Dev_ID, Offset |
| S2 | 0 | Dev_ID, Offset |
| S2 | 8 | Dev_ID, Offset |
| ⋮ | ⋮ | ⋮ |
| S2 | 8(n-1) | Dev_ID, Offset |
| S3 | 0 | Dev_ID, Offset |
| S3 | 8 | Dev_ID, Offset |
| ⋮ | ⋮ | ⋮ |
| S3 | 8(n-1) | Dev_ID, Offset |
| VOL | 0 | Dev_ID, Offset |
| VOL | 8 | Dev_ID, Offset |
| ⋮ | ⋮ | ⋮ |
| VOL | 8(n-1) | Dev_ID, Offset |

FACILITATING ACCESS TO FRAGMENTED SNAPSHOT DATA

TECHNICAL FIELD

This disclosure relates generally to data storage systems and, more particularly, to techniques for managing snapshot volumes in a data storage system.

BACKGROUND

State-of-the-art data storage systems are designed with the goal of enhancing storage efficiency and performance. For example, storage systems typically implement data protection schemes such as volume snapshots. Snapshots are point-in-time copies of a storage volume, which can be utilized for purposes such as backup, recovery, testing, and cloning, etc. A volume snapshot generation functionality provides the ability to "freeze" the data of a storage volume at a certain point in time, wherein a given snapshot can also serve as the source for other snapshots that are spawned from it. In other words, a given snapshot serves as a read-only copy of the source data at the point in time in which the given snapshot was created and is accessible like a regular storage volume. A given snapshot is typically thin-provisioned and only stores data that is written to the volume after the given snapshot is created. As such, any reads to data of the volume, which is not included in the given snapshot, will require access to a previous snapshot or the original volume.

With such snapshot schemes, after a workload of random writes while taking snapshots frequently, the snapshot data can be fragmented. In such an instance, a sequential read operation to read multiple sequential logical offsets of the storage volume may require the read operation to traverse a relatively large portion of a snapshot metadata structure to find the relevant metadata entries for sequentially accessing the data from multiple snapshots. Since a snapshot metadata structure typically does not fit entirely in random-access memory (RAM), scattered access to the metadata requires many portions of the snapshot metadata structure to be swapped into RAM to find the relevant metadata, which leads to a large overhead for metadata reads when accessing fragmented snapshot data.

SUMMARY

Exemplary embodiments of the disclosure include techniques for facilitating access to fragmented snapshot data. For example, an exemplary embodiment includes a method that is performed by a storage control system. The method comprises generating a snapshot data structure of a storage volume, wherein the snapshot data structure comprises plurality of nodes comprising a volume node and one or more snapshot nodes, wherein the volume node is configured to store new and updated data that is written to logical offsets of the storage volume, and wherein the one or more snapshot nodes comprise point-in-time copies of data of the storage volume taken at different times; and adding an entry for the volume node in a metadata structure associated with the snapshot data structure, wherein the entry comprises a reference to a physical location of data held by a given one of the snapshot nodes at a given logical offset of the storage volume.

Other embodiments will be described in the following detailed description of exemplary embodiments, which is to be read in conjunction with the accompanying figures.

BRIEF DESCRIPTION OF THE DRAWINGS

FIG. 1 schematically illustrates a network computing environment which comprises a storage system that is configured to facilitate access to fragmented snapshot data, according to an exemplary embodiment of the disclosure.

DETAILED DESCRIPTION

Figures 2A, 2B:
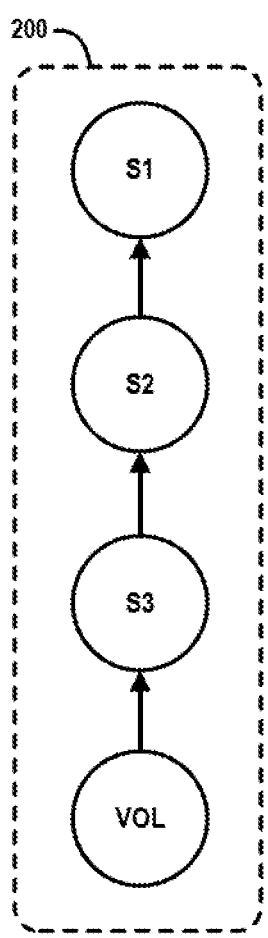
FIG. 2A schematically illustrates a snapshot data structure comprising a snapshot volume tree that is associated with a given storage volume, according to an exemplary embodiment of the disclosure.
FIG. 2B illustrates an exemplary snapshot metadata structure that is utilized to organize metadata which represents the content of each node of the snapshot volume tree of FIG. 2A, according to an exemplary embodiment of the disclosure.

Exemplary embodiments of the disclosure will now be described in further detail with regard to techniques to facilitate access to fragmented snapshot data. For purposes of illustration, exemplary embodiments will be described herein with reference to exemplary network computing systems with distributed storage systems and data processing systems, which implement associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

FIG. 1 schematically illustrates a network computing environment which comprises a storage system that is configured to facilitate access to fragmented snapshot data, according to an exemplary embodiment of the disclosure. In particular, FIG. 1 schematically illustrates a network computing environment 100 which comprises a plurality of compute nodes 110-1, 110-2, . . . 110-c (collectively, compute nodes 110), a communications network 120, and a distributed storage system 130 comprising a cluster of storage nodes 132-1, 132-2, . . . , 132-$n$ (collectively, storage nodes 132). As further shown in FIG. 1, the storage node 132-1 comprises a storage control system 140, and storage devices 150. In some embodiments, the storage control system 140 comprises a software-defined storage system, wherein the storage control system 140 comprises various software components including, but not limited to, a storage data server 142, a deduplication manager 144, and a snapshot manager 146, and other software-based data management services, the functions of which will be explained below. In some embodiments, the storage nodes 132-2 . . . 132-$n$ have the same or similar configuration as the storage node 132-1 shown in FIG. 1.

The storage devices 150 of a given storage node 132 can be, e.g., internal storage devices and/or direct-attached storage devices, and may comprise one or more of various types of storage devices such as hard-disk drives (HDDs), solid-state drives (SSDs), flash memory cards (e.g., PCIe cards), or other types of non-volatile memory (NVM) devices including, but not limited to, non-volatile random-access memory (NVRAM), phase-change RAM (PC-RAM), magnetic RAM (MRAM), and other types of storage media, etc. In some embodiments, the storage devices 150 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 150 may be implemented on each storage node 132. In this regard, the term "storage device" as used herein should be broadly construed to encompass all types of storage media including hybrid drives. On a given storage node 132, the storage control system 140 is configured to communicate with the storage devices 150 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

As illustrated in FIG. 1, the storage devices 150 of a given storage node 132 have storage capacity that is logically partitioned into logical storage volumes 160, where each of the logical storage volumes can be distributed over multiple storage devices of multiple storage nodes 132. The storage devices 150 further provide storage resources for snapshot data structures 170, a deduplication database 180, deduplication reference metadata structures 182, and snapshot metadata structures 184. In some embodiments, the deduplication database 180 and deduplication reference metadata structures 182 are generated and managed by the deduplication manager 144, and the snapshot metadata structures 184 are generated and managed by the snapshot manager 146.

The compute nodes 110 comprise physical server nodes and/or virtual server nodes which host and execute applications (e.g., application instances, virtual machines, containers, etc.) that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). The application instances that run on the compute nodes 110 utilize the distributed storage system 130 to store user/application data. In some embodiments, the compute nodes 110 comprise application servers, database servers, etc. The compute nodes 110 can host virtual nodes such as virtual machines and hypervisors, and container systems. In some embodiments, the compute nodes 110 comprise a cluster of compute nodes of, e.g., an enterprise computing system, a cloud-based computing system, or other types of computing systems or information processing systems comprising multiple computing nodes associated with respective users.

The communications network 120 comprises one or more types of communications networks to enable communication between the compute nodes 110 and the storage nodes 132, as well as peer-to-peer communication between the storage nodes 132. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), RDMA over Converged Ethernet (RoCE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

In some embodiments, each storage node 132 comprises a server node (e.g., storage-only node) that is implemented on, e.g., a physical server machine or storage appliance comprising hardware processors, system memory, and other hardware resources that execute software and firmware to implement the functionality of the storage node 132 and the associated storage control system 140. In some embodiments, each storage node 132 comprises a plurality of control processors which execute a lightweight operating system (e.g., a customized lightweight Linux kernel) and functional software (e.g., software-defined storage software) to implement functions of the storage control system 140, as discussed in further detail below. In some embodiments, a converged infrastructure can be implemented to provide a single-layer deployment in which the application layer (implemented by compute nodes 110) and the storage layer (implemented by the storage node 132) are deployed on the same server nodes in the network computing environment 100 such that each server node is a data storage consumer (compute node) and a data storage supplier (storage node).

The distributed storage system 130 may comprise any type of data storage system, or a combination of data storage systems, including, but not limited to, a storage area network (SAN) system, a dynamic scale-out data storage system, or other types of distributed data storage systems comprising software-defined storage, clustered or distributed virtual and/or physical infrastructure. The term "distributed data storage system" or "data storage system" as used herein should be broadly construed and not viewed as being limited to storage systems of any particular type or types. In some embodiments, the distributed storage system 130 comprises a dynamic scale-out storage system which allows additional storage nodes 132 to be added (or removed) to the cluster to scale the performance and storage capacity of the distributed storage system 130. It is to be noted that each storage node 132 (with its associated storage devices 150) is an example of what is more generally referred to herein as a "storage system" or a "storage array."

In some embodiments, the distributed storage system 130 comprises a dynamic scale-out software-defined storage system which is configured to implement a high-capacity block-level SAN storage system (e.g., virtual SAN system) that consolidates the capacity of the storage devices 150 (e.g., HDDs, SSDs, NVMe flash storage, flash PCIe cards etc.) of the storage nodes 132 into shared block storage which is logically partitioned into logical storage volumes identified by, e.g., logical unit numbers (LUNs), logical block device IDs (e.g., ISCI IDs), etc. In some embodiments, the exemplary software-defined storage system and associated components as described herein are implemented using a PowerFlex™ software-defined storage product from Dell Technologies, which implements the snapshot management systems and methods as discussed herein. A PowerFlex software-defined storage system creates a server-based storage area network (SAN) from local server storage using, e.g., x86 servers, and converts direct-attached storage into shared block storage than runs over an IP-based network. In this regard, software components of a PowerFlex software-defined storage system execute on the storage nodes 132 to implement a software-defined storage environment in which the storage nodes 132 form a loosely coupled storage server cluster and collectively communicate and operate to create a server-based virtual SAN system to provide host access to a virtual pool of block storage using the combined storage capacity (e.g., storage devices 150) of the storage nodes 132. The software-defined storage system collectively implements various functions for deploying and managing a software-defined, scale-out server SAN architecture that can grow to hundreds and thousands of severs.

More specifically, in the scale-out software-defined storage environment, the storage data servers 142 of the storage control systems 140 are configured to create and manage storage pools (e.g., virtual pools of block storage) by aggregating storage capacity of the respective storage devices 150 and dividing each storage pool into one or more logical volumes (e.g., logical storage volumes 160 and snapshot data structures 170). The logical volumes are exposed as block devices to client applications which reside and execute on the compute nodes 110, wherein the block devices (e.g., virtual disks) are assigned unique identifiers (e.g., SCSI IDs). For example, a block device may comprise one or more volumes of a storage pool. Each block device comprises any number of actual physical storage devices, wherein each block device is preferably homogenous in terms of the type of storage devices that make up the block device (e.g., a block device can include only HDD devices or SSD devices, etc.).

In some embodiments, each compute node 110 which runs a client application that consumes storage of the distributed storage system 130 runs an instance of a block device driver that exposes the logical storage volumes as block devices to the client applications that execute on the given compute node 110. During operation, the block device driver intercepts client I/O requests, and utilizes the intercepted I/O request to access the block storage managed by the storage data servers 142. In some embodiments, the block device driver is installed in the operating system or hypervisor hosting the application layer and provides the block device drivers have knowledge of which storage data server 142 components hold their respective block data, so multipathing can be accomplished natively through the block device drivers.

The deduplication manager 144 implements methods for performing data deduplication to reduce the amount of data in a storage system. In general, data deduplication involves discovering and removing duplicate data, wherein a deduplication operation takes place when the same block of data or file is written to multiple locations of the storage system. The process of removing duplicate data generally includes replacing the duplicate data with a reference (e.g., pointer) to a single instance of the data, thereby reducing the amount of stored data.

More specifically, in some embodiments, the deduplication manager 144 implements a block-level deduplication (or sub-file deduplication) scheme which is configured to compare data blocks (alternatively, data items, data chunks, or shards) to identify and eliminate duplicate data blocks. The block-level deduplication process eliminates duplicate/redundant data blocks that are the same, even when the files which contain the duplicate data blocks are not entirely identical. In some embodiments, a block-level deduplication scheme is implemented by dividing data (e.g., file) into fixed sized data blocks (e.g., 4 KB, 8 KB, etc.) and creating a unique content signature (e.g., hash value) for each unique data block. For example, assuming that data is divided into 8 KB chunks, a 16 KB file will be divided into two 8 KB data blocks, and an associated unique content signature will be generated for each of the two 8 KB data blocks.

The deduplication manager 144 implements methods that are configured to compute unique content signatures for data blocks. In some embodiments, the unique content signatures comprise unique hash values for data blocks. The unique hash values are computed using a suitable hashing algorithm, such as Secure Hash Algorithm (e.g., SHA-1, SHA-2, SHA-256), which is configured to create a cryptographic alpha-numeric value (referred to as a hash value) for a given data block. The content signatures for the data blocks are stored in the deduplication database 180.

In some embodiments, the deduplication database 180 comprises a persistent key-value (K-V) store which is configured to map unique content signatures (keys) of data blocks to respective unique values (e.g., virtual addresses or physical addresses) within the data storage system. In some embodiments, the deduplication database 180 comprises a local persistent deduplication database which comprises a subset of unique content signatures (e.g., hash values) of a global content signature space (e.g., hash space), which is assigned to the given storage node 131-1 to implement a distributed deduplication database across all or some of the storage nodes of the distributed storage system 130, using known techniques.

In some embodiments, the content signatures that are stored in the deduplication database 180 may comprise (i) strong signatures that are strong enough to allow deduplication of the data without performing byte-by-byte data comparison, or (ii) weak signatures that provide a strong hint that duplicate data has likely been identified but requires further validation by the deduplication manager 144 performing a data compare process, e.g., byte-by-byte data comparison, to determine if a new data block is a duplicate of an existing data block. More specifically, in some embodiments, an entire computed hash value for each unique data block (e.g., long, strong hash value) is stored in the deduplication database. In this instance, when the deduplication manager 144 finds a match between a computed hash value of a new data block with a unique hash value in the deduplication database 180, the deduplication manager 144 can deem the new data block to be a duplicate (or most likely a duplicate) of an existing data block in the data storage system.

Further, the deduplication manager 144 implements methods that are configured to generate and manage the deduplication reference metadata structures 182 which comprise references to existing data blocks in the logical storage volumes 160. For example, for a block-level deduplication scheme, when a match occurs between a given data block and an existing (stored) data block, the given data block is deemed to be a duplicate data bock (or redundant data block), and the duplicate data block is replaced with a reference that points to the stored data block. The deduplication manager 144 implements methods that are configured to maintain a reference count for each data block, wherein the reference count for a given data block denotes a number of storage nodes that hold a reference (e.g., pointer) to the given data block. The reference count for a given data block allows the storage node to decide when it is safe to delete the given data block when the reference count is zero (0). Otherwise, if the reference count for a given data block is greater than zero, the storage node will not delete/release the data block, as the reference count greater than zero indicates that at least one other storage node requires access to the data block.

In some embodiments, the deduplication reference metadata structures 182 comprise a logical-to-virtual mapping table, and a virtual-to-physical mapping table. The logical-to-virtual mapping table comprises a mapping data structure which maps a given logical address space (e.g., volume/offset space) to a virtual address space. The logical address space is the space that host applications and operating systems use to access data in the storage system. A logical address space for a given volume can be partitioned and sharded across multiple storage nodes. A logical address is an address (e.g., logical block address (LBA)) that represents a given volume and a given offset of a given data block (or data chunk). For example, a logical address can include a volume ID, or an internal representation along with more metadata that is required for implementing various features such as snapshots. In some embodiments, the logical space comprises a key entry per chunk of data (e.g., 8 KB data block), wherein the key represents an offset in the given volume at chunk granularity. The virtual address space comprises a unique virtual key for each chunk of data (e.g., 8 KB) which is written and consumes capacity. In the case of deduplication, multiple logical keys can point to the same virtual key. The virtual-to-physical mapping table comprises a mapping data structure which maps a virtual space to a physical space. In particular, the virtual-to-physical mapping table maps each unique virtual key to a respective physical storage location in the storage system. In many cases, the virtual-to-physical mapping table will also include a corresponding reference count for each virtual key, wherein the reference count for a given virtual key tracks a number of logical-to-virtual pointers that point to the given virtual key for the given physical location. It is to be noted that the "physical location" can potentially be layered on top of another level of indirection rendering it less "physical." Exemplary embodiments of the deduplication reference metadata structures 182 will be discussed in further detail below in conjunction with FIG. 4.

The snapshot manager 146 implements methods that are configured to generate and manage the snapshots 170 (or snapshot data structures 170) of one or more of the logical storage volumes 160. Each snapshot data structure 170 is associated with one of the logical storage volumes 160. The snapshot data structures 170 comprise, for example, snapshot volume trees or other relational structures which identify relationships between the snapshots associated with the logical storage volumes 160. In addition, the snapshot manager 146 implements methods that are configured to generate and maintain the snapshot metadata structure 184 for respective snapshot data structures 170 (e.g., snapshot volume tree). In some embodiments, each snapshot metadata structure 184 comprises a mapping table which maps nodes of a corresponding snapshot data structure 170 for a given storage volume to data blocks held by the snapshot nodes. Moreover, in some embodiments, the snapshot manager 146 is configured to utilize deduplication references from the deduplication reference metadata structures 182 to create references that are added to entries of a given snapshot metadata structure 184 to facilitate access to fragmented snapshot data of a corresponding snapshot data structure 170. FIGS. 2A, 2B, 3A and 3B illustrate exemplary embodiments of snapshot data structures and associated snapshot metadata structures, as well as techniques for managing snapshot metadata structures, according to exemplary embodiments of the disclosure.

FIGS. 2A and 2B schematically illustrate a snapshot data structure and associated snapshot metadata structure, according to an exemplary embodiment of the disclosure. In particular, FIG. 2A schematically illustrates snapshot data structure which comprises a snapshot volume tree 200 that is associated with a given storage volume. The term "snapshot volume tree" as used herein refers to a data structure which holds a root volume and all snapshots associated with the volume, and which maintains a relationship between all snapshots resulting from one volume. The snapshot volume tree 200 comprises a chain (or a tree) of dependent volumes and snapshots which captures the state of a given storage volume at different points in time. For example, FIG. 2A illustrates an exemplary snapshot volume tree 200 which comprises a sequence of incremental snapshots S1, S2, and S3 (volume snapshots) and a volume VOL from which snapshots S1, S2, and S3 were taken in that order. The snapshots S1, S2, and S3, and the volume VOL of the snapshot volume tree 200 are referred to herein as "nodes" or "volume nodes" of the snapshot volume tree 200.

Each snapshot S1, S2, and S3 comprises a read-only, point-in-time copy of the storage volume. Each snapshot S1, S2, and S3 comprises uniquely-written data (e.g., new data blocks or updated/modified data blocks) that was written to the given storage volume. In particular, the snapshot S1 represents an initial read-only snapshot that was taken of the given storage volume at some point in time. As such, the initial snapshot S1 comprises all data which exists in the given storage volume at the point in time when the initial snapshot S1 was taken. The snapshot S2 represents a second read-only snapshot that was taken of the given storage volume at some point in time subsequent to taking the initial snapshot S1. The snapshot S2 comprises all uniquely-written data (e.g., new data blocks or updated/modified data blocks) that was written to the given storage volume subsequent to taking the initial snapshot S1 and before taking the snapshot S2. The snapshot S3 represents a third read-only snapshot that was taken of the given storage volume at some point in time subsequent to taking the second snapshot S2. The snapshot S3 comprises all uniquely-written data (e.g., new data blocks or updated/modified data blocks) that was written to the given storage volume subsequent to taking the second snapshot S2 and before taking the third snapshot S3.

Furthermore, the volume VOL node represents a current volume which exists at the point in time following creation of the last snapshot (e.g., snapshot S3), wherein new and updated data is written to the volume VOL node (e.g., the lowest node in the snapshot volume tree 200), while the data in the upper nodes (e.g., snapshots S1, S2, and S3) remain unchanged. For example, in the exemplary embodiment of FIG. 2A, at the point in time when the snapshot S3 is taken, the volume VOL is empty and all content of the storage volume is located in the upper nodes (e.g., read-only snapshots S1, S2, and S3). When new and updated/modified data is written to the storage volume, the data is written to the volume VOL node. The data writes to logical offsets in the volume VOL node mask the data content in corresponding logical offsets in the upper nodes (e.g., snapshots S1, S2, and S3), as will be explained in further detail below.

Furthermore, when reading a data block at a given logical offset in the storage volume, if a data entry for the logical offset exists in the volume VOL node, the data block is returned. On the other hand, if a data entry for the given logical offset does not exist in the volume VOL node, the read process will determine if a data entry for the given logical offset exists in the parent node (e.g., snapshot S3), and return the data block from the snapshot S3 node if the data entry exists. If a data entry for the given logical offset does not exist in the snapshot S3 node, the read process will determine if a data entry for the given logical offset exists in the parent node (e.g., snapshot S2), and return the data block from the snapshot S2 node if the data entry exists. If a data entry for the given logical offset does not exist in the snapshot S2 node, the read process will know that the data entry for the given logical offset exists in the snapshot S1 node (uppermost node in the snapshot volume tree 200), and return the data block from the snapshot S1 node. The read operation utilizes a snapshot metadata structure and associated snapshot tree metadata to traverse the nodes of the snapshot volume tree 200 to find the data entry for target logical offset to read from.

For example, FIG. 2B illustrates an exemplary snapshot metadata structure that is utilized to organize metadata which represents the contents of each node in the snapshot volume tree 200 of FIG. 2A, according to an exemplary embodiment of the disclosure. In particular, FIG. 2B illustrates a snapshot metadata structure which comprises a key-value mapping table data structure 210 (or mapper 210) which is used to represent the contents of each node, e.g., volume VOL and snapshot nodes S1, S2, and S3, of the snapshot volume tree 200. The mapper 210 comprises a table data structure which includes a plurality of records (rows) and fields (columns). Each record (row) in the mapper 210 comprises a plurality of fields (columns) including a VOL_ID field, an OFFSET field, and a LOCATION field.

In an exemplary embodiment, each row in the mapper 210 comprises a key: value pair, wherein the values (entries) of the VOL_ID and OFFSET fields for a given row in the mapper 210 comprise a "key" for the given row, and the value (entry) of the LOCATION field comprises the "value" of the key. The entries in the VOL_ID fields include volume identifiers (or node identifiers) for the volumes (or nodes) in the snapshot volume tree 200, e.g., VOL, S1, S2, and S3. The entries in the OFFSET fields represent the logical offsets in the corresponding volumes (e.g., VOL, S1, S2, and S3).

For example, in the exemplary non-limiting embodiment of FIG. 2B, it is assumed that the data block size (or allocation unit) is 8 KB, wherein the entries in the OFFSET fields denote the logical offsets in the volume at a granularity of 8 KB. In particular, for a given storage volume having a given number n of data blocks (with a block size of 8 KB), the OFFSET fields include logical offset values of 0, 8, 16, . . . , 8(n−1).

Furthermore, the entries in the LOCATION fields (i.e., the values of keys) are pointers which indicate the physical location where data is stored. In some embodiments, the entry of each LOCATION field includes an identifier of a given storage device (denoted Dev_ID) and offset within the given storage device (denoted Offset), wherein the data is stored. The values for the LOCATION fields can include other types of information, depending on the application. For purposes of discussion of the mapper 210 illustrated in FIG. 2B, it is assumed that each node (VOL, S1, S2, and S3) in the snapshot volume tree 200 includes data written between the offsets 0 KB and 8(n−1) KB. However, in some embodiments, when a given offset in a given node does not have data written to the given offset, the mapper 210 will not have a row entry for the given offset.

Figure 3A:
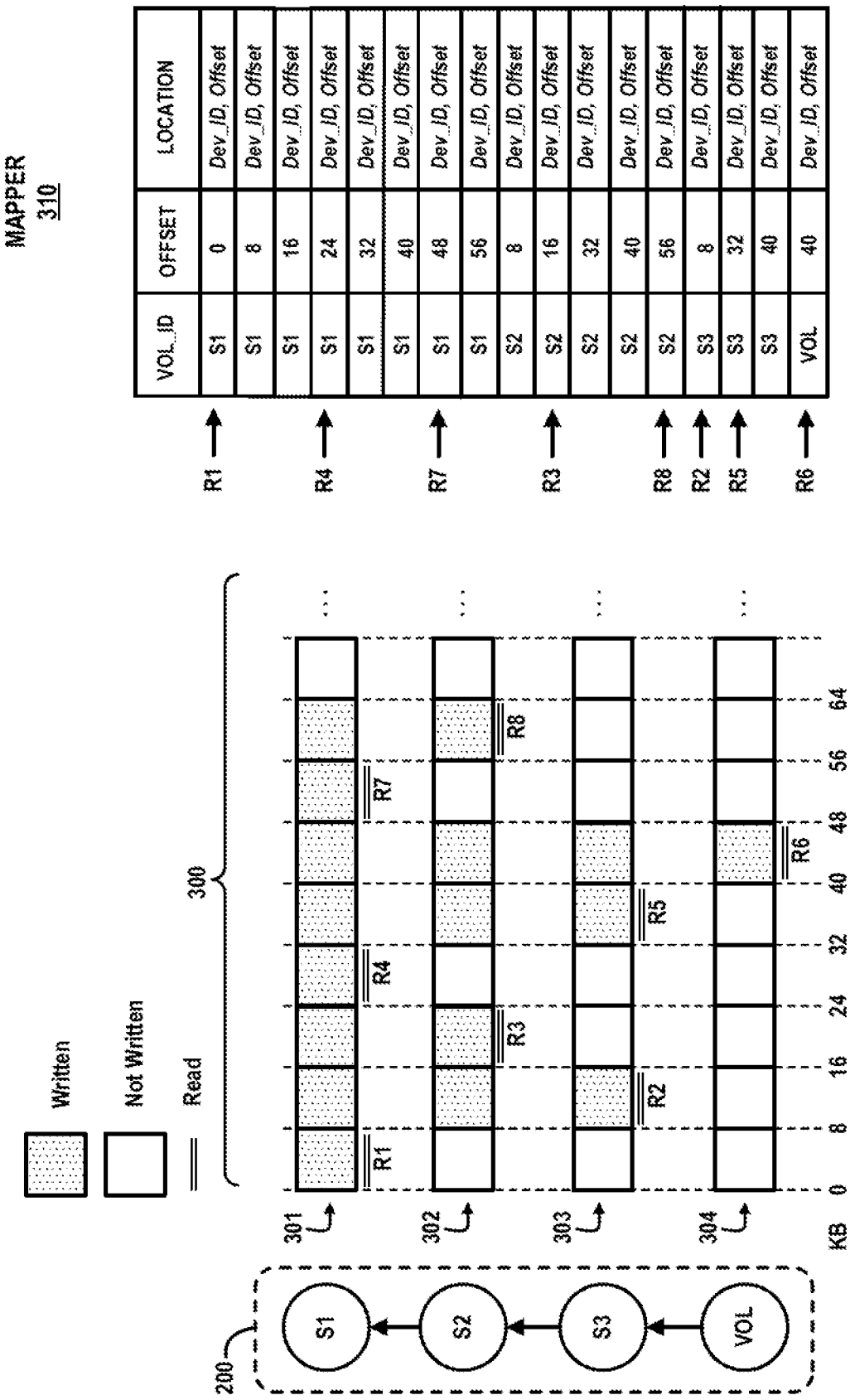
FIG. 3A schematically illustrates a process for reading fragmented snapshot data from a snapshot volume tree, according to an exemplary embodiment of the disclosure.

With a snapshot scheme as shown in FIGS. 2A and 2B, as noted above, the snapshot data can be fragmented such that a sequential read operation for reading multiple sequential logical offsets of the storage volume may require the read operation to traverse a relatively large portion of the mapper 210 to find the relevant metadata for accessing the sequential data from multiple nodes. For example, FIG. 3A schematically illustrates a process for reading fragmented snapshot data from a snapshot volume tree, according to an exemplary embodiment of the disclosure. In particular, FIG. 3A illustrates a process for reading fragmented snapshot data from the exemplary snapshot volume tree 200 for a given storage volume 300 having address spaces 301, 302, 303, and 304 for the nodes S1, S2, S3, and VOL, respectively. For case of illustration, FIG. 3A shows address spaces 301, 302, 303, and 304 over a given address range of 0 KB to 64 KB of the storage volume 300, and a corresponding snapshot metadata structure 310 (alternatively, mapper 310) with entries for the nodes S1, S2, S3, and VOL over the given address range.

The address spaces 301, 302, 303, and 304 of the respective nodes S1, S2, S3, and VOL each include logical offsets at a granularity of 8 KB, e.g., logical offsets of 0 KB, 8 KB, 16 KB, 24 KB, 32 KB, 40 KB, 48 KB, 56 KB, and 64 KB, etc. As schematically illustrated in FIG. 3A, areas of the address spaces 301, 302, 303, and 304 which are written to (i.e., offsets having 8 KB data blocks) are shown as shaded blocks, while areas of the address spaces 301, 302, 303, and 304 which are not written are shown as unshaded blocks. In this regard, FIG. 3A illustrates an illustrative embodiment in which each current 8 KB data block (e.g., most recently written data block) of the storage volume 300 resides in a different node of the snapshot volume tree 200.

In particular, a first data block at the logical offset 0 KB resides in the snapshot S1, a second data block at the logical offset 8 KB resides in the snapshot S3, a third data block at the logical offset 16 KB resides in the snapshot S2, a fourth data block at the logical offset 24 KB resides in the snapshot S1, a fifth data block at the logical offset 32 KB resides in the snapshot S3, a sixth data block at logical offset 40 KB resides in the VOL node, a seventh data block at the logical offset 48 KB resides in the snapshot S1, and an eighth data block at the logical offset 56 KB resides in the snapshot S2. As further shown in FIG. 3A, the mapper 310 comprises (i) entries for the snapshot S1 at the logical offsets 0 KB, 8 KB, 16 KB, 24 KB, 32 KB, 40 KB, 48 KB, and 56 KB, (ii) entries for the snapshot S2 at the logical offsets 8 KB, 16 KB, 32 KB, 40 KB, and 56 KB, (iii) entries for the snapshot S3 at the logical offsets 8 KB, 32 KB, and 40 KB and (iv) an entry for the VOL node at the logical offset 40 KB.

FIG. 3A illustrates an exemplary sequential read operation in which the storage volume 300 is read over the address range of 0 KB-64 KB with read operations R1, R2, R3, R4, R5, R6, R7, and R8 performed in sequence. As noted above, when reading from a target logical offset in the storage volume 300, the read process will start with the volume VOL node by determining whether the mapper 310 comprises an entry for the target logical offset in the address space 304. If not, the read process with continue by determining whether the mapper 310 comprises an entry for the target logical offset in the address space 303 for the snapshot S3, which is the parent node for the volume VOL node, and so on.

For example, in the illustrative embodiment of FIG. 3A, the read process R1 for accessing the content at the logical offset 0 KB of the storage volume 300 starts with accessing the mapper 310 to determine whether a key exists for VOL_ID=VOL, OFFSET=0 KB. Since such a key does not exist, the read process continues with searching the mapper 310 to determine whether a key exists for VOL_ID=S3, OFFSET=0 KB. Since, such a key does not exist, the read process continues with searching the mapper 310 to determine whether a key exists for VOL_ID=S2, OFFSET=0 KB. Since such key does not exist, and since the snapshot S1 is the only remaining node, the read process continues with searching the mapper 310 to find the key for VOL_ID=S1, OFFSET=0 KB, and then access the content at the location information specified in the corresponding LOCATION field. The same process is performed for each subsequent read operation R2-R8. It is to be noted that since the volume VOL node contains the current content at the logical offset 40 KB, the mapper 310 includes an entry for the key VOL_ID=VOL, OFFSET=40 KB, the read process R6 will access the data specified at the corresponding LOCATION and does not need to access the ancestor snapshot nodes S3, S2, and S1.

Since each current 8 KB offset resides in a different node of the snapshot volume tree 200, the metadata for each 8 KB offset is located in a different portion of the mapper 310, which leads to a random metadata access that may also require to swap in different metadata pages from storage. As schematically shown in FIG. 3A, the order of the sequential read operations R1. R2, R3, R4, R5, R6, R7, and R8 corresponds to the order of metadata access in the mapper 310, wherein the relevant metadata entries for the sequential read operations R1, R2, R3, R4, R5, R6, R7, and R8 are disposed in different region over the mapper 310. As noted above, since the snapshot metadata (e.g., the mapper 310) typically does not entirely fit in RAM, such scattered access to metadata can require different portions (e.g., metadata pages) of the mapper 310 to be swapped into RAM, resulting in a relatively large overhead for reading the snapshot metadata.

In some embodiments, as noted above, assuming the storage system supports a data management scheme such as deduplication which implements referencing, efficient access to the fragmented snapshot data as shown in FIG. 3A is facilitated by inserting references (e.g., deduplication references) in volume VOL entries in the mapper 310 for the given storage volume, wherein such references in the volume VOL entries point directly to the physical location of the data and eliminate the need to traverse the snapshots (e.g., S3→S2→S1) and access different portions of the mapper 310 to find the target offset of a given node having the current content. For example, FIG. 3B schematically illustrates a process for facilitating access to the fragmented snapshot data of FIG. 3A, according to an exemplary embodiment of the disclosure.

Figure 3B:
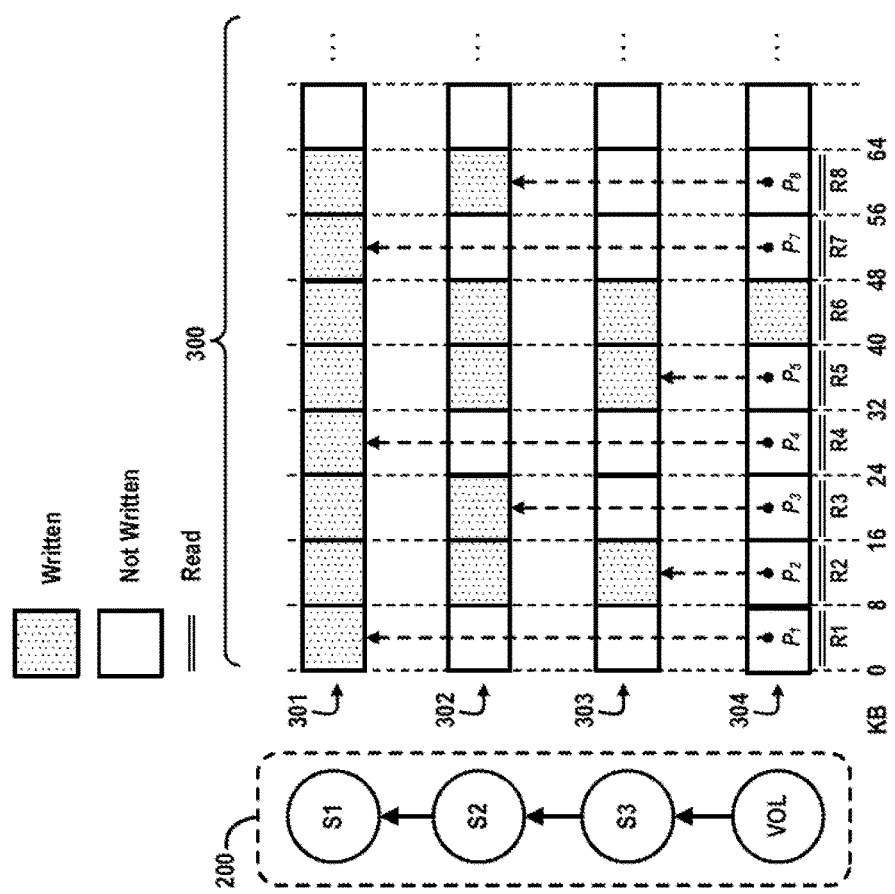
FIG. 3B schematically illustrates a process for facilitating access to the fragmented snapshot data of FIG. 3A, according to an exemplary embodiment of the disclosure.

Similar to FIG. 3A, the exemplary embodiment of FIG. 3B illustrates the storage volume 300 having the same address spaces 301, 302, 303, and 304 and data content (or lack of data content) for the logical offsets 0 KB, 8 KB, 16 KB, 24 KB, 32 KB, 40 KB, 48 KB, and 56 KB of the respective nodes S1, S2, S3, and VOL of the snapshot volume tree 200. However, FIG. 3B illustrates that additional entries are added to the mapper 310 for the logical offsets 0 KB, 8 KB, 16 KB, 24 KB, 32 KB, 48 KB, and 56 KB of the address space 304 for the volume VOL node. In some embodiments, the additional entries include deduplication references which provide pointers $P_1$, $P_2$, $P_3$, $P_4$, $P_5$, $P_7$, and $P_8$ that point directly (or indirectly) to the physical location where the current data blocks are located for the logical offsets of the address space 304 for the volume VOL node which are not written to. In some embodiments, as explained in further detail below in conjunction with FIG. 4, the deduplication metadata comprises key-value pairs, wherein the key comprises, e.g., a virtual address, and the value is a physical address which is mapped to the virtual address. In this instance, the key (e.g., virtual address) of a given deduplication metadata entry is stored as the value in the mapper 310 (i.e., in LOCATION field) to enable access to the physical data pointed to by the virtual address.

In particular, as shown in FIG. 3B, the mapper 310 includes the following additional entries: (i) an entry having a key VOL, 0, with value, $P_1$, that points to the location of the physical data block that is associated with the logical offset 0 KB of the address space 301 for the snapshot S1; (ii) an entry having a key VOL, 8, with value, $P_2$, that points to the location of the physical data block that is associated with the logical offset 8 KB of the address space 303 for the snapshot S3; (iii) an entry having a key VOL, 16, with value, $P_3$, that points to the location of the physical data block that is associated with the logical offset 16 KB of the address space 302 for the snapshot S2; (iv) an entry having a key VOL, 24, with value, $P_4$, that points to the location of the physical data block that is associated with the logical offset 24 KB of the address space 301 for the snapshot S1; (v) an entry having a key VOL, 32, with value, $P_5$, that points to the location of the physical data block that is associated with the logical offset 32 KB of the address space 303 for the snapshot S3; (vi) an entry having a key VOL, 48, with value, $P_7$, that points to the location of the physical data block that is associated with the logical offset 48 KB of the address space 301 for the snapshot S1; and (vii) an entry having a key VOL, 56, with value, $P_8$, that points to the location of the physical data block that is associated with the logical offset 56 KB of the address space 302 for the snapshot S2.

As noted above, in some embodiments, the values $P_1$, $P_2$, $P_3$, $P_4$, $P_5$, $P_7$, and $P_8$ (which are stored in respective LOCATION fields of the mapper 310) comprise respective deduplication metadata keys (e.g., virtual addresses) which point to the location of the physical data. In the exemplary embodiment shown in FIG. 3B, the entry having the key VOL, 40, does not require a deduplication reference as the current content for the logical offset 40 KB is located in the volume VOL node at the physical location indicated by the value, e.g., the Dev_ID, Offset, the associated LOCATION field.

With this exemplary configuration, a sequential read operation comprising the read operations R1, R2, R3, R4, R5, R6, R7, and R8 can be performed by accessing the metadata entries in the mapper 310 for the volume VOL node, without having to access the metadata entries for the snapshots S3, S2, or S1. It is to be noted that the deduplication references (e.g., pointers $P_1, P_2, P_3, P_4, P_5, P_7,$ and $P_8$) that are included in the volume VOL entries are not pointers to logical offsets in the logical address spaces 301, 302, and 303 of the respective snapshot nodes S1, S2 or S3, but rather the deduplication references are pointers to the physical locations of the data associated with the logical offsets of such address spaces. Again, this eliminates the need to read metadata associated with the snapshot nodes S1, S2, and S3 in the snapshot volume tree 200 when reading from the volume VOL node over the logical address range from 0 KB to 64 KB.

Instead, as schematically shown in FIG. 3B, the sequence of read operations R1, R2, R3, R4, R5, R6, R7, and R8 can be performed by sequentially accessing the metadata entries of the volume VOL node in the mapper 310 to determine the location of the content (e.g., 8 KB data blocks) to be read. Since the volume VOL node includes a metadata entry in the mapper 310 for each of the logical offsets 0 KB, 8 KB, 16 KB, 24 KB, 32 KB, 40 KB, 48 KB, and 56 KB, there is no need to access any of the ancestor snapshot nodes S1, S2, or S3 since all the relevant metadata needed to access the current content (e.g., data blocks) at the logical offsets 0 KB, 8 KB, 16 KB, 24 KB. 32 KB, 40 KB, 48 KB, and 56 KB of the storage volume 300 is included at the level of the volume VOL node. The use of the references (e.g., deduplication references) in the entries of the volume VOL node results in alignment of the metadata and effectively defragments the snapshot data over the logical address range of 0 KB to 64 KB of the storage volume 300, without having to move data or having to perform a lookup in higher node levels in snapshot volume tree.

Figure 4:
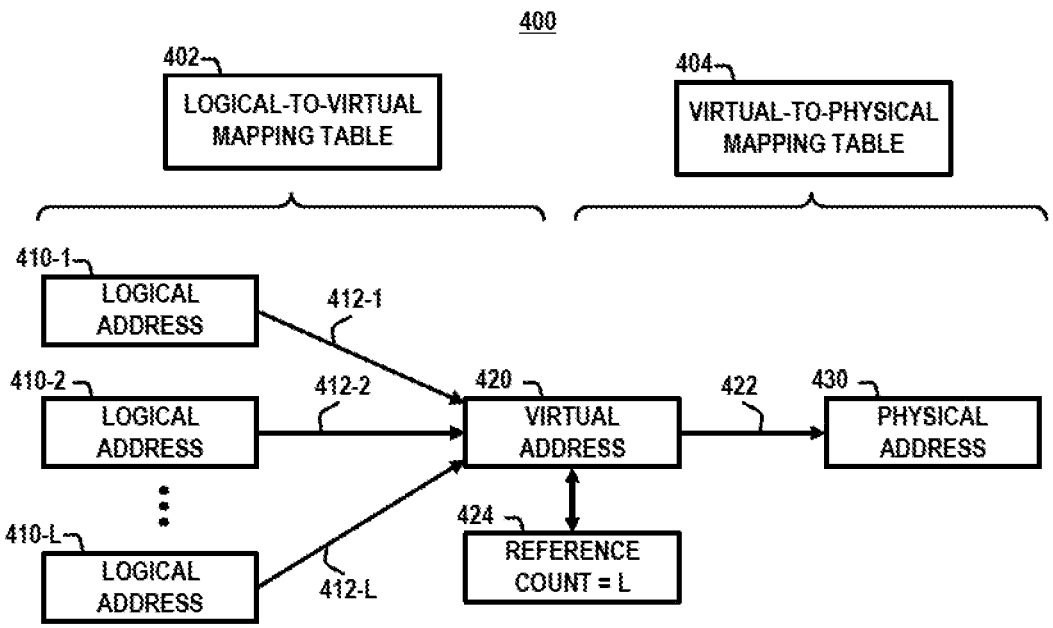
FIG. 4 schematically illustrates a deduplication reference scheme which can be utilized to facilitate access to the fragmented snapshot data, according to an exemplary embodiment of the disclosure.

FIG. 4 schematically illustrates a deduplication reference scheme 400 which can be utilized to facilitate access to the fragmented snapshot data, according to an exemplary embodiment of the disclosure. For example, FIG. 4 schematically illustrates a logical-to-virtual mapping table 402 and a virtual-to-physical mapping table 404, according to an exemplary embodiment of the disclosure. The logical-to-virtual mapping table 402 comprises a plurality (L) of logical addresses 410-1, 410-2, . . . , 410-L that are mapped to a single virtual address 420. The virtual address 420 comprises a unique virtual address which is mapped to a physical address 430 which stores a given data block (e.g., 8 KB data chunk). In this example, the logical addresses 410-1, 410-2, . . . , 410-L comprises respective logical-to-virtual pointers 412-1, 412-2, . . . , 412-L which point to the given virtual address 420 (virtual key), and the virtual address 420 comprises a virtual-to-physical pointer 422 which points to the physical address 430. As further shown in FIG. 4, the virtual address 420 (or virtual key) is mapped to a given reference count 424 which indicates a number, L, of logical addresses which point to the given virtual address 420.

With this exemplary configuration, a single pointer (e.g., virtual-to-physical pointer 422) points to the physical address 430, while all logical addresses 410-1, 410-2, . . . , 410-L which hold a reference to the given physical address 430 point to the unique virtual address 420 that is mapped to the given physical data block stored at the given physical address 430. When the given data block (currently stored at the physical address 430) is moved to another physical address, only the virtual-to-physical pointer 422 needs to be updated to point to the new physical address where the given data block is stored. In this instance, there is no need to update the logical-to-virtual pointers 412-1, 412-2, . . . , 412-L which point to the given virtual address 420 since the virtual address 420 still points to the given data block that is referenced by the logical addresses 410-1, 410-2, . . . , 410-L.

The exemplary deduplication reference scheme 400 can be utilized by a snapshot manager to generate references that are included in VOL entries that are added to the mapper 310 to point directly to, e.g., the virtual locations of data blocks that are stored at logical offsets of the address spaces of ancestor snapshots nodes. For example, the snapshot manager can utilize the mapping metadata of the logical-to-virtual mapping table 402 to determine the virtual address associated with a given logical address (e.g., logical offset) and then utilize the virtual-to-physical mapping table 404 to determine a current physical location of the data block corresponding to the given logical offset. It is to be noted that FIG. 4 illustrates an exemplary, non-limiting embodiment of a referencing scheme that can be utilized by the snapshot manager to create references for facilitating access to fragmented snapshot data, and that other types of referencing schemes for deduplication or other data management systems can be implemented to create references for facilitating access to fragmented snapshot data.

It is to be appreciated that the use of the references (e.g., deduplication references) in the metadata entries of the mapper 310 to optimize read operations does not need to be implemented over the entire logical address space of the storage volume 300. Instead, such optimization can be selectively utilized in areas (e.g., logical address ranges) of the logic address space which are problematic, e.g., an area of the logical address space which has a relatively large number of successive logical offsets in which the current data blocks of such areas are spread over multiple nodes of the snapshot volume tree, etc. In general, various factors and conditions are considered to determine when it is optimal and otherwise desirable to include deduplication references into entries for the volume VOL node in the mapper 310, wherein such factors and conditions include, but are not limited to, circumstances in which there is a read-intensive I/O workload with may sequential reads from the storage volume, the snapshot data is fragmented to a level where the data to be read is spread over many nodes of the snapshot volume tree, the storage volume is not heavily written to, etc.

Figure 5:
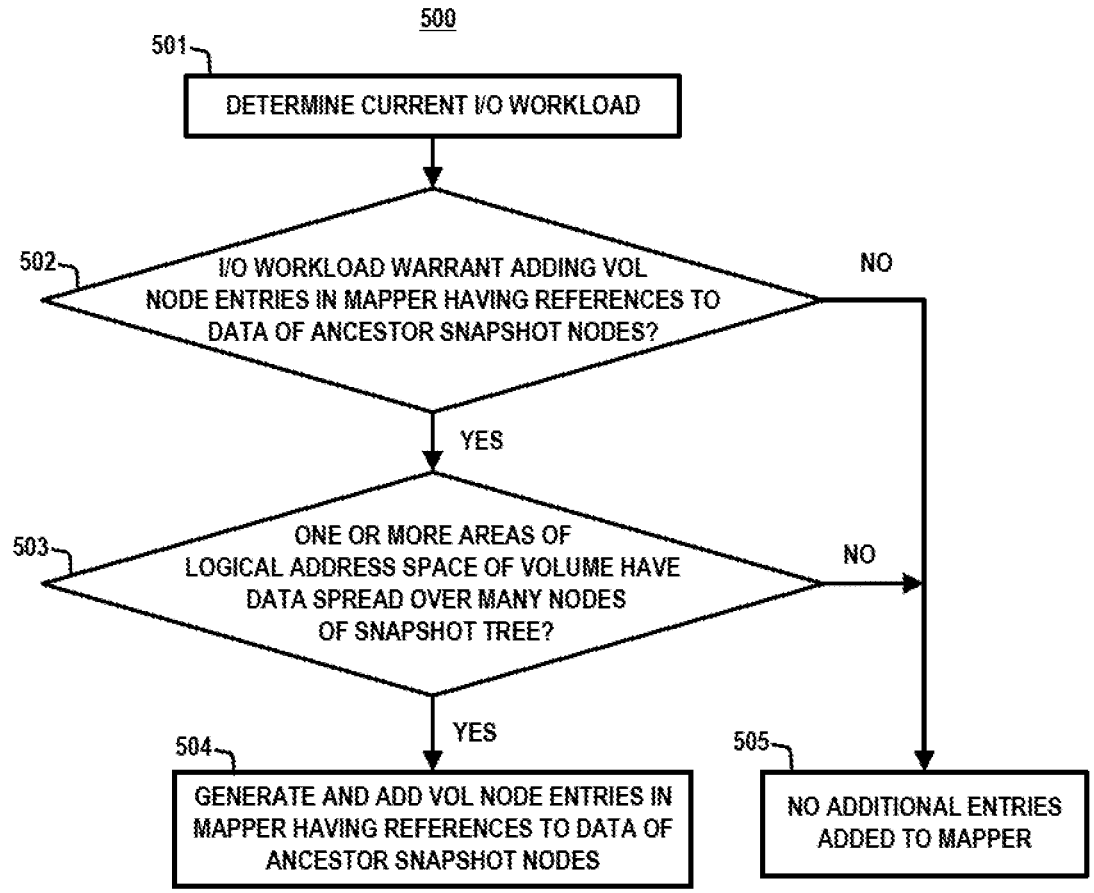
FIG. 5 is a flow diagram which illustrates a method for facilitating access to fragmented snapshot data, according to an exemplary embodiment of the disclosure.

FIG. 5 is a flow diagram which illustrates a method for facilitating access to fragmented snapshot data, according to an exemplary embodiment of the disclosure. In some embodiments, FIG. 5 illustrates an exemplary process 500 that is performed by the snapshot manager 146 (FIG. 1) to optimize access to fragmented snapshot data in which one or more areas of the logical address space of storage volume has data that is spread over many nodes of a snapshot volume tree. The process 500 can be performed periodically and/or in response to some triggering event. The process 500 comprises determining a current I/O workload (block 501) and determining whether the current I/O workload warrants generating and adding volume VOL node entries in the snapshot metadata structure (e.g., mapper 310), which have references to data of ancestor snapshot nodes (block 502). As noted above, the current I/O workload is one factor that is considered when determining whether or not to generate references to data of ancestor snapshot nodes and add them to metadata entries of the volume VOL node in the snapshot metadata structure of the snapshot volume tree.

For example, during periods of write intensive I/O workloads where new and/or updated data is being written to logical offsets of the volume VOL node of the snapshot volume tree, it is not cost-effective in terms of using resources to generate the references adding new volume VOL node entries to the mapper 310 because writes to the volume VOL node would effectively overwrite the entries with the deduplication references. In this regard, during periods of write intensive workloads, the snapshot manager can determine that the current I/O workload does not warrant generating and adding volume VOL node entries in the mapper 310, which have references to data of ancestor snapshot nodes (negative determination in block 502) and refrain from creating deduplication references and adding new volume VOL node entries to the snapshot metadata structure (block 505) under circumstances where such entries would soon be overwritten as a result of write intensive I/O workloads.

On the other hand, during periods of read intensive I/O workloads where the data of the storage volumes does not frequently change, the snapshot manager can determine that the current I/O workload does warrant generating and adding volume VOL node entries in the mapper 310, which have references to data blocks of ancestor snapshot nodes (affirmative determination in block 502), and then determine if one or more areas of the logical address space of the storage volume have data that is spread over many nodes of the snapshot volume tree (block 503). For example, in making such determination, the snapshot manager can sample or otherwise analyze the current entries of the snapshot metadata structure (e.g., mapper 310) for the various nodes within the snapshot volume tree to determine an average diversity of the source nodes from which data is read. For example, if there is given area (logical address range) of the storage volume where the data is sourced from many different nodes in the snapshot volume tree and the data in the given area is typically sequentially read, the snapshot manager can proceed to generate and add volume VOL node entries in the mapper which have references to the data of the ancestor snapshot nodes (block 504) to, e.g., facilitate the reading (e.g., sequential reading) of data in the given area of the storage volume.

Figure 6:
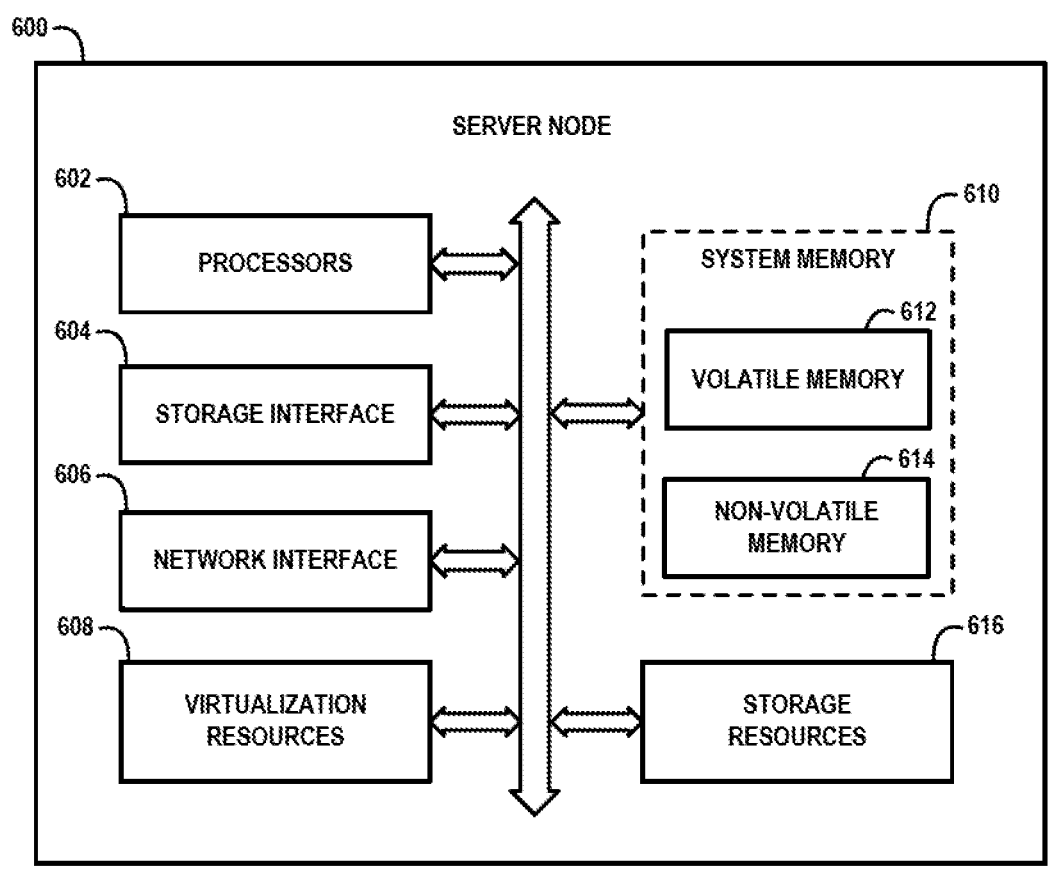
FIG. 6 schematically illustrates a framework of server node for hosting software components of storage system which implements a snapshot data manager that is configured to facilitate access to fragmented snapshot data, according to an exemplary embodiment of the disclosure.

FIG. 6 schematically illustrates a framework of server node for hosting software components of storage system which implements a snapshot data manager that is configured to facilitate access to fragmented snapshot data, according to an exemplary embodiment of the disclosure. For example, FIG. 6 schematically illustrates an exemplary hardware/software configuration of, e.g., the storage nodes shown in FIG. 1. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities as discussed herein. In some embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well execute one or more of the various modules and functionalities of a storage system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent software components of a software-defined storage system as described, as well as the exemplary storage system shutdown and startup processes as described herein, are implemented using program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Computer program products which comprise a non-transitory processor-readable storage medium having stored therein program code of one or more software programs are considered embodiments of the disclosure. A processor-readable storage medium may comprise, for example, a storage device such as a storage disk, a storage array or an integrated circuit containing memory. The term "processor-readable storage medium" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
generating, by a storage control system, a snapshot data structure of a storage volume, wherein the snapshot data structure comprises plurality of nodes comprising a volume node and one or more snapshot nodes, wherein the volume node is configured to store data that is written to one or more logical offsets of the storage volume, and wherein the one or more snapshot nodes comprise point-in-time copies of data of the storage volume taken at different times;
for a given logical offset of the storage volume for which data has not been stored by the volume node, the storage control system adding a volume node entry for the given logical offset in a metadata structure associated with the snapshot data structure, wherein the volume node entry comprises a reference which points to a physical location of a current version of a data block held by a given one of the snapshot nodes other than the volume node at the given logical offset of the storage volume, wherein the reference is determined by the storage control system using existing referencing metadata associated with the storage volume; and
utilizing, by the storage control system, the reference in the volume node entry of the volume node in the metadata structure to access the current version of the data block held by the given one of the snapshot nodes.

2. The method of claim 1, wherein the snapshot data structure comprises a snapshot tree structure in which the one or more snapshot nodes comprise a chain of incremental snapshots taken of the storage volume at different times.

3. The method of claim 1, wherein:
the metadata structure associated with the snapshot data structure comprises a mapping table data structure comprising a metadata entry for each logical offset in each logical address space of each node of the snapshot data structure which holds a data block of the storage volume; and
each metadata entry comprises a key-value pair, wherein the key comprises a combination of a node identifier and logical offset and the value comprises a physical location of a data block stored at the logical offset in the logical address space of the node.

4. The method of claim 1, wherein the existing referencing metadata comprises deduplication reference metadata which is utilized by the storage control system to determine the reference to the physical location of data held by the given one of the snapshot nodes at the given logical offset of the storage volume.

5. The method of claim 1, further comprising, for a given sequence of logical offsets of the storage volume for which data has not been stored by the volume node, the storage control system adding a sequence of volume node entries for the given sequence of logical offsets in the metadata structure associated with the snapshot data structure, wherein each volume node entry of the sequence of volume node entries comprises a respective reference which points to a physical location of a current version of a data block held by a given one of the snapshot nodes other than the volume node at a respective logical offset of the given sequence of logical offsets of the storage volume, wherein each reference is determined by the storage control system using the existing referencing metadata associated with the storage volume.

6. The method of claim 5, further comprising performing, by the storage control system, a sequential read operation to sequentially access the data blocks in the sequence of logical offsets of the storage volume, which are held by the one or more snapshot nodes, by accessing the sequence of volume node entries for the volume node in the metadata structure to determine the physical location of the data blocks.

7. The method of claim 5, further comprising:
determining, by the storage control system, a current input/output (I/O) workload associated with the storage volume;
adding the sequence of entries for the volume node in the metadata structure, in response to determining the current I/O workload comprises a read I/O workload; and
refraining from adding the sequence of volume node entries for the volume node in the metadata structure, in response to determining the current I/O workload comprises a write intensive I/O workload.

8. The method of claim 5, further comprising:
determining, by the storage control system, a fragmentation level of the snapshot data structure; and
adding the sequence of volume node entries for the volume node in the metadata structure, in response to determining that the fragmentation level of the snapshot data structure exceeds a threshold.

9. A computer program product comprising a non-transitory processor-readable storage medium having stored therein program code of one or more software programs, wherein the program code when executed by at least one processing device causes the at least one processing device to implement a storage control system that is configured to perform a snapshot management process which comprises:
generating a snapshot data structure of a storage volume, wherein the snapshot data structure comprises plurality of nodes comprising a volume node and one or more snapshot nodes, wherein the volume node is configured to store data that is written to one or more logical offsets of the storage volume, and wherein the one or more snapshot nodes comprise point-in-time copies of data of the storage volume taken at different times;
for a given logical offset of the storage volume for which data has not been stored by the volume node, adding a volume node entry for the given logical offset in a metadata structure associated with the snapshot data structure, wherein the volume node entry comprises a reference which points to a physical location of a current version of a data block held by a given one of the snapshot nodes other than the volume node at the given logical offset of the storage volume, wherein the reference is determined by the storage control system using existing referencing metadata associated with the storage volume; and
utilizing the reference in the volume node entry of the volume node in the metadata structure to access the current version of the data block held by the given one of the snapshot nodes.

10. The computer program product of claim 9, wherein the snapshot data structure comprises a snapshot tree structure in which the one or more snapshot nodes comprise a chain of incremental snapshots taken of the storage volume at different times.

11. The computer program product of claim 9, wherein:
the metadata structure associated with the snapshot data structure comprises a mapping table data structure comprising a metadata entry for each logical offset in each logical address space of each node of the snapshot data structure which holds a data block of the storage volume; and
each metadata entry comprises a key-value pair, wherein the key comprises a combination of a node identifier and logical offset and the value comprises a physical location of a data block stored at the logical offset in the logical address space of the node.

12. The computer program product of claim 9, wherein the existing referencing metadata comprises deduplication reference metadata which is utilized to determine the reference to the physical location of data held by the given one of the snapshot nodes at the given logical offset of the storage volume.

13. The computer program product of claim 9, for a given sequence of logical offsets of the storage volume for which data has not been stored by the volume node, further comprising program code for adding a sequence of volume node entries for the given sequence of logical offsets in the metadata structure associated with the snapshot data structure, wherein each volume node entry of the sequence of volume node entries comprises a respective reference which points to a physical location of a current version of a data block held by a given one of the snapshot nodes other than the volume node at a respective logical offset of the given sequence of logical offsets of the storage volume, wherein each reference is determined by the storage control system using the existing referencing metadata associated with the storage volume.

14. The computer program product of claim 13, further comprising program code for performing a sequential read operation to sequentially access the data blocks in the sequence of logical offsets of the storage volume, which are held by the one or more snapshot nodes, by accessing the sequence of volume node entries for the volume node in the metadata structure to determine the physical location of the data blocks.

15. The computer program product of claim 13, further comprising program code for:
determining a current input/output (I/O) workload associated with the storage volume;
adding the sequence of volume node entries for the volume node in the metadata structure, in response to determining the current I/O workload comprises a read I/O workload; and
refraining from adding the sequence of volume node entries for the volume node in the metadata structure, in response to determining the current I/O workload comprises a write intensive I/O workload.

16. The computer program product of claim 13, further comprising program code for:
determining a fragmentation level of the snapshot data structure; and adding the sequence of volume node entries for the volume node in the metadata structure, in response to determining that the fragmentation level of the snapshot data structure exceeds a threshold.

17. An apparatus, comprising:
at least one processing device, and memory to store program instructions that are executed by the at least one processing device to implement a storage control system that is configured to:
generate snapshot data structure of a storage volume, wherein the snapshot data structure comprises plurality of nodes comprising a volume node and one or more snapshot nodes, wherein the volume node is configured to store data that is written to one or more logical offsets of the storage volume, and wherein the one or more snapshot nodes comprise point-in-time copies of data of the storage volume taken at different times;
for a given logical offset of the storage volume for which data has not been stored by the volume node, add a volume node entry for the given logical offset in a metadata structure associated with the snapshot data structure, wherein the volume node entry comprises a reference which points to a physical location of a current version of a data block held by a given one of the snapshot nodes other than the volume node at the given logical offset of the storage volume, wherein the reference is determined by the storage control system using existing referencing metadata associated with the storage volume; and
utilize the reference in the volume node entry of the volume node in the metadata structure to access the current version of the data block held by the given one of the snapshot nodes.

18. The apparatus of claim 17, wherein:
the snapshot data structure comprises a snapshot tree structure in which the one or more snapshot nodes comprise a chain of incremental snapshots taken of the storage volume at different times;
the metadata structure associated with the snapshot data structure comprises a mapping table data structure comprising a metadata entry for each logical offset in each logical address space of each node of the snapshot data structure which holds a data block of the storage volume; and each metadata entry comprises a key-value pair, wherein the key comprises a combination of a node identifier and logical offset, and wherein the value comprises a physical location of a data block stored at the logical offset in the logical address space of the node.

19. The apparatus of claim 17, wherein the existing referencing metadata comprises deduplication reference metadata which is utilized to determine the reference to the physical location of data held by the given one of the snapshot nodes at the given logical offset of the storage volume.

20. The apparatus of claim 17, wherein:
for a given sequence of logical offsets of the storage volume for which data has not been stored by the volume node, the storage control system is configured to add a sequence of volume node entries for the given sequence of logical offsets in the metadata structure associated with the snapshot data structure, wherein each volume node entry of the sequence of volume node entries comprises a respective reference which points to a physical location of a current version of a data block held by a given one of the snapshot nodes other than the volume node at a respective logical offset of the given sequence of logical offsets of the storage volume, wherein each reference is determined by the storage control system using the existing referencing metadata associated with the storage volume; and
the storage control system is configured to perform a sequential read operation to sequentially access the data blocks in the sequence of logical offsets of the storage volume, which are held by the one or more snapshot nodes, by accessing the sequence of volume node entries for the volume node in the metadata structure to determine the physical location of the data blocks.

* * * * *